May 10, 1955  J. MARTIN  2,708,083
EJECTION SEATS FOR AIRCRAFT
Filed Aug. 23, 1952  13 Sheets-Sheet 4
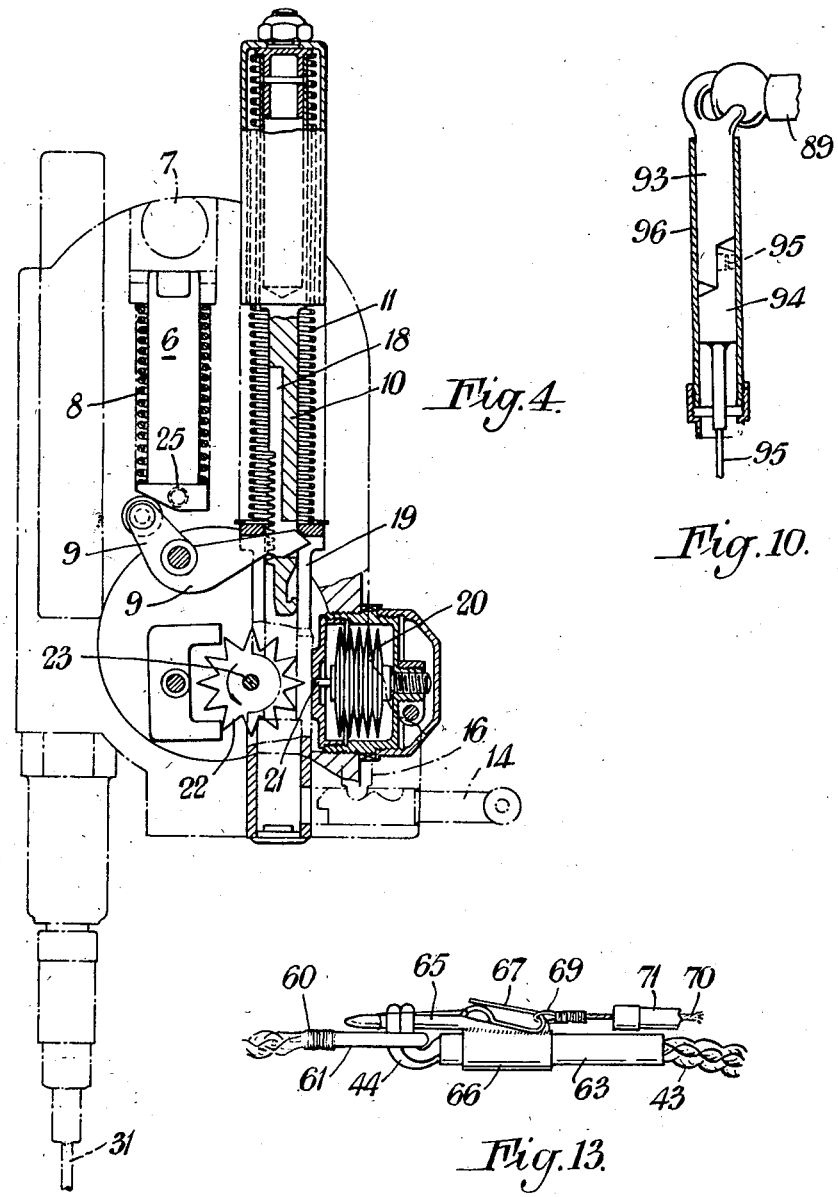
Inventor
JAMES MARTIN
per Worth Wade
Attorney.

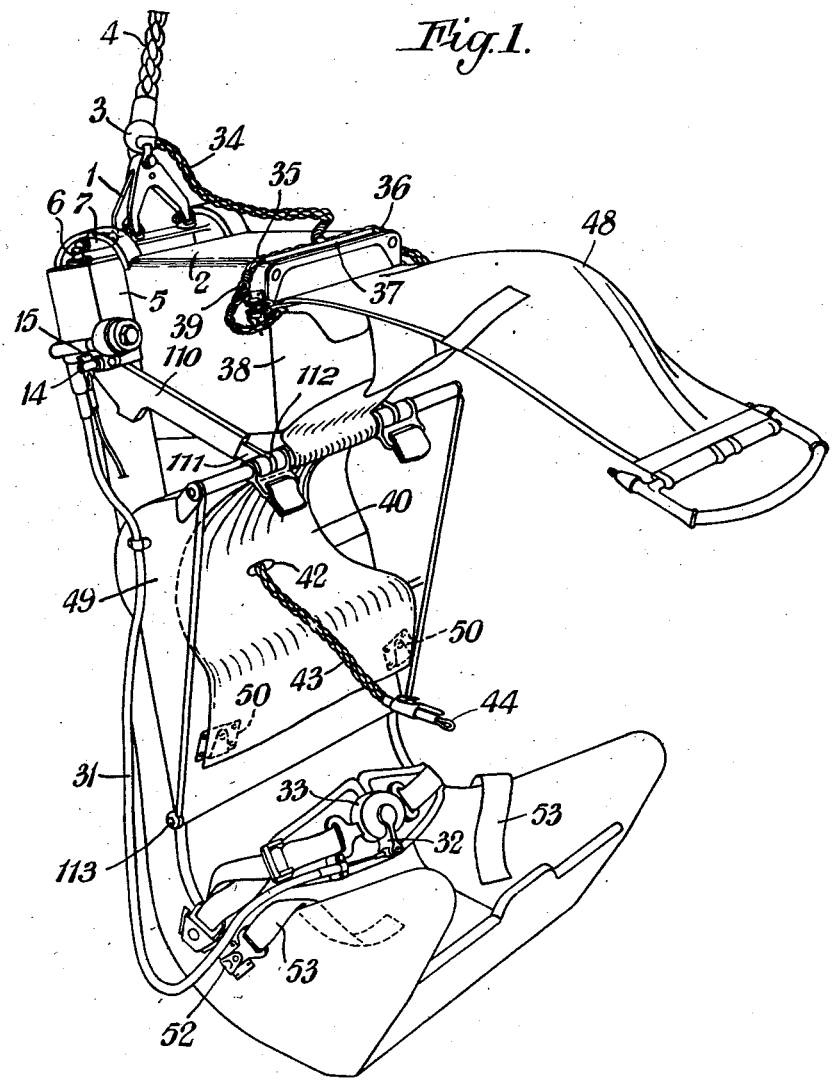

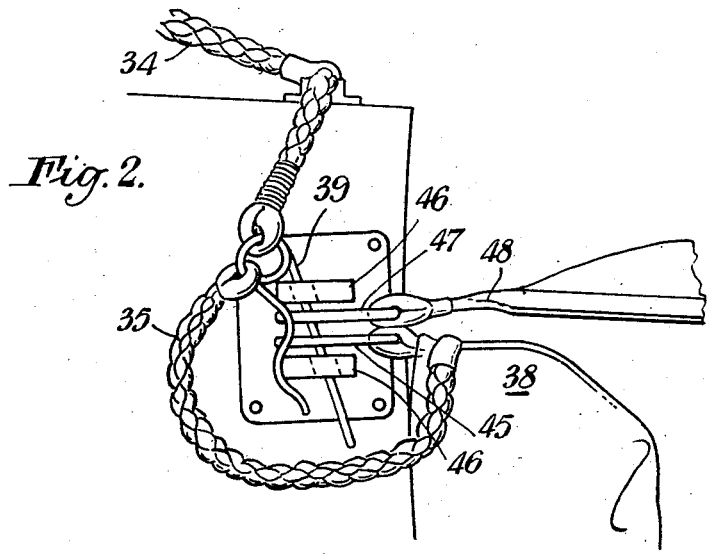
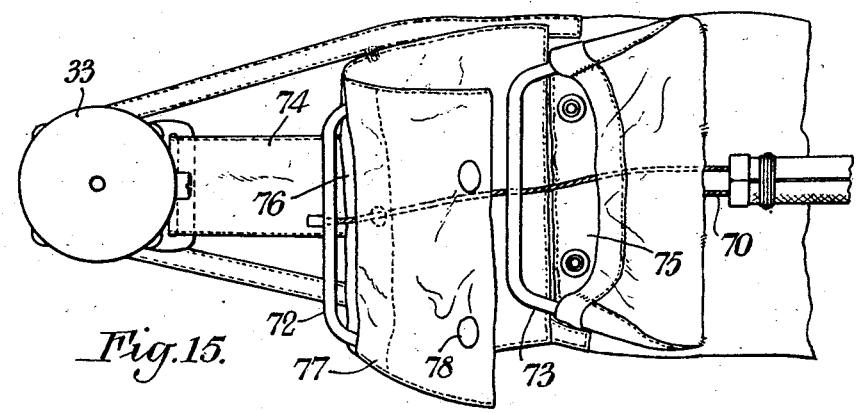
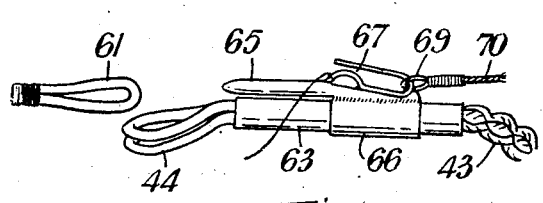

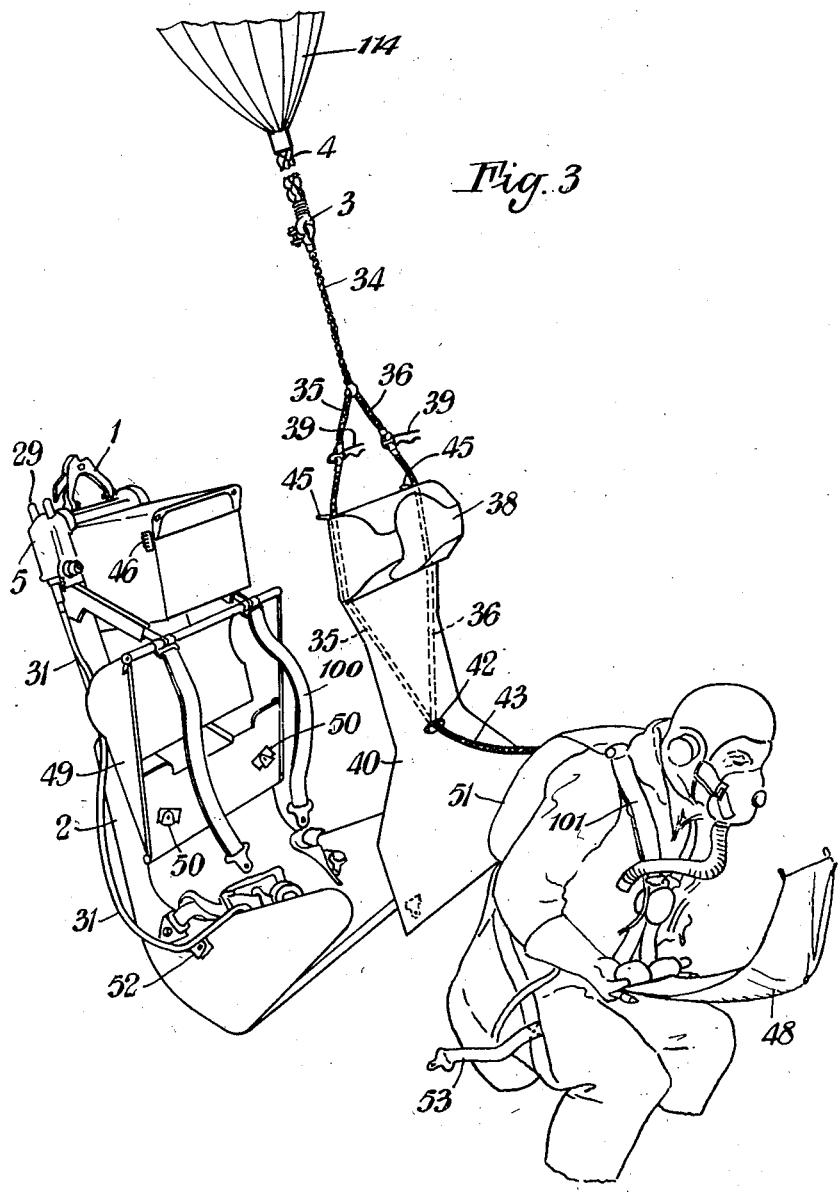

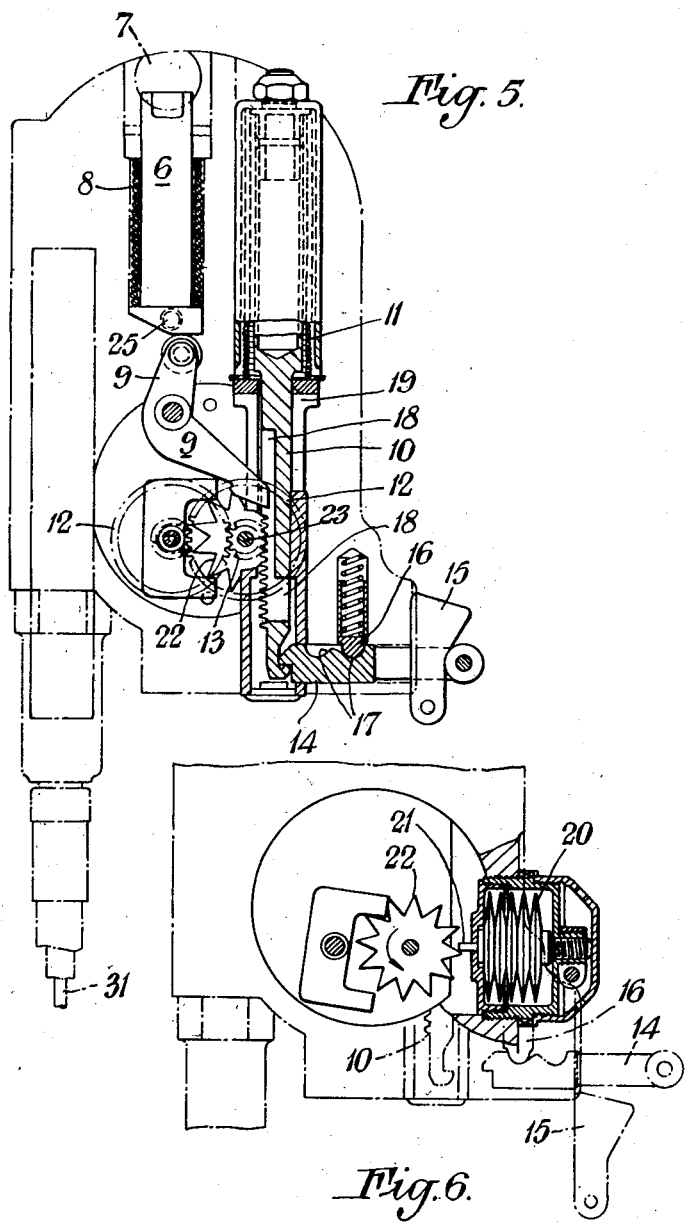

May 10, 1955  J. MARTIN  2,708,083
EJECTION SEATS FOR AIRCRAFT
Filed Aug. 23, 1952  13 Sheets-Sheet 8

Inventor
JAMES MARTIN
per Worth Wade
Attorney.

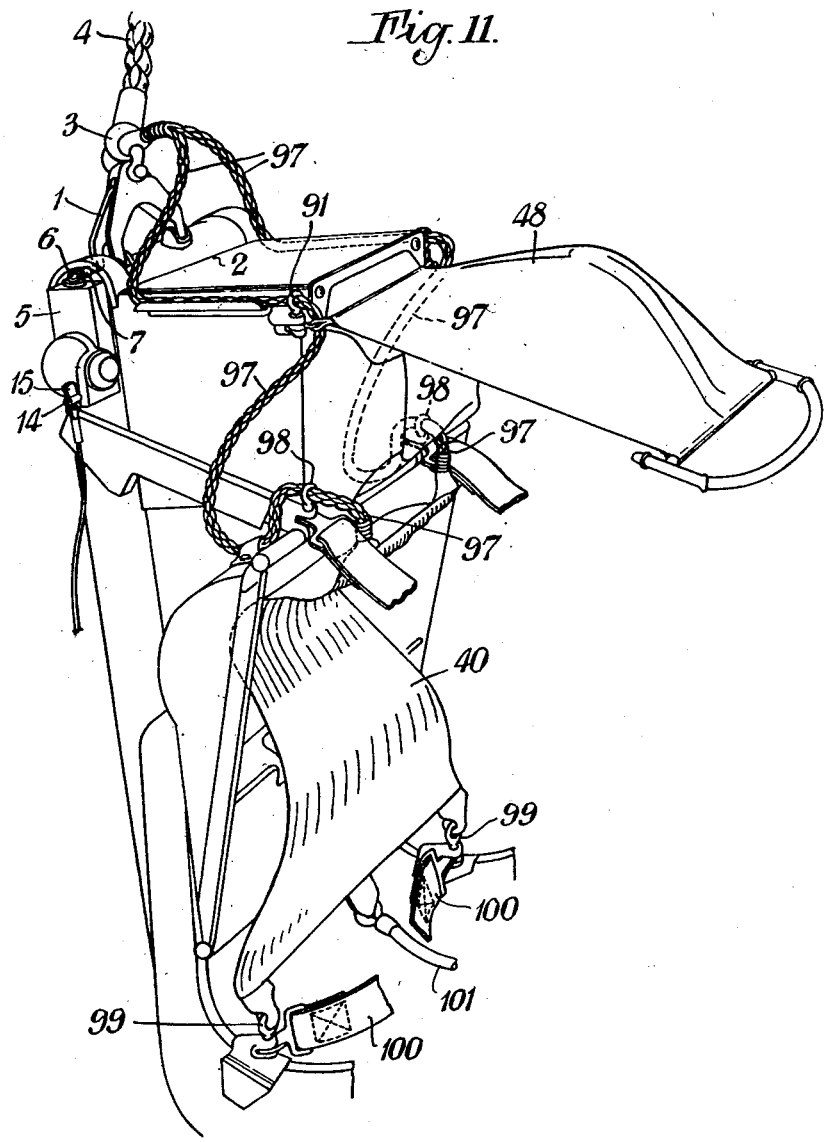

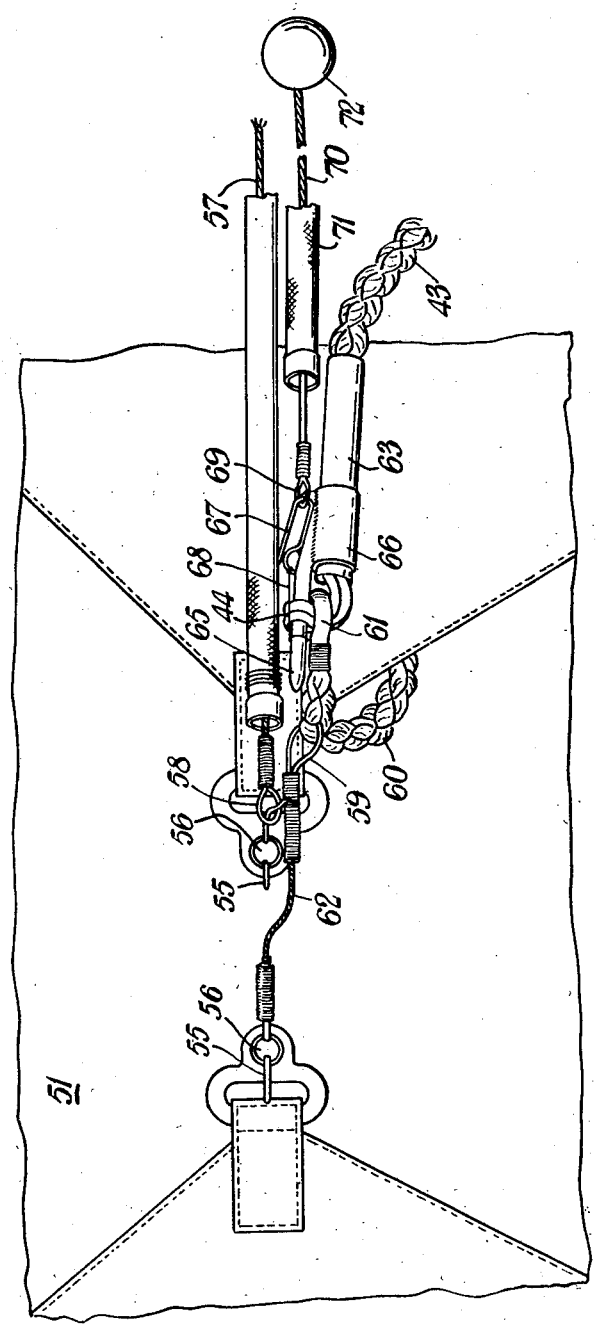

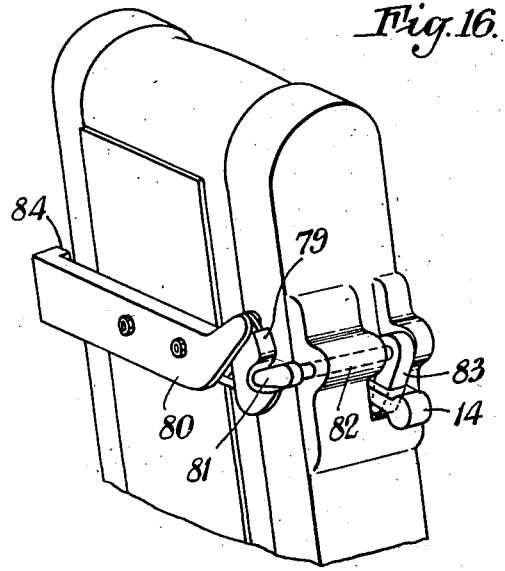
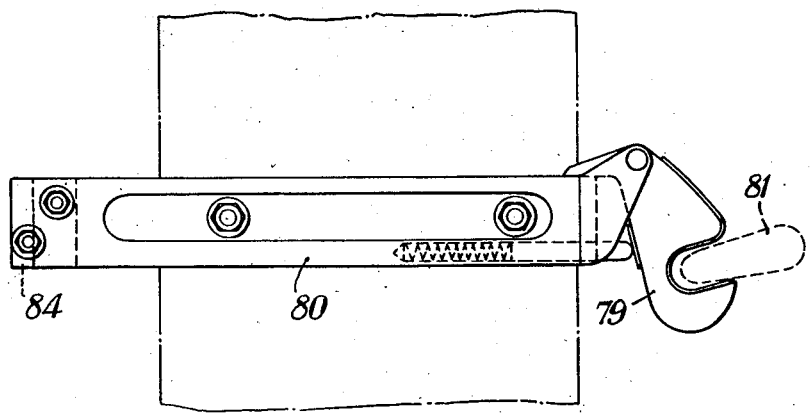

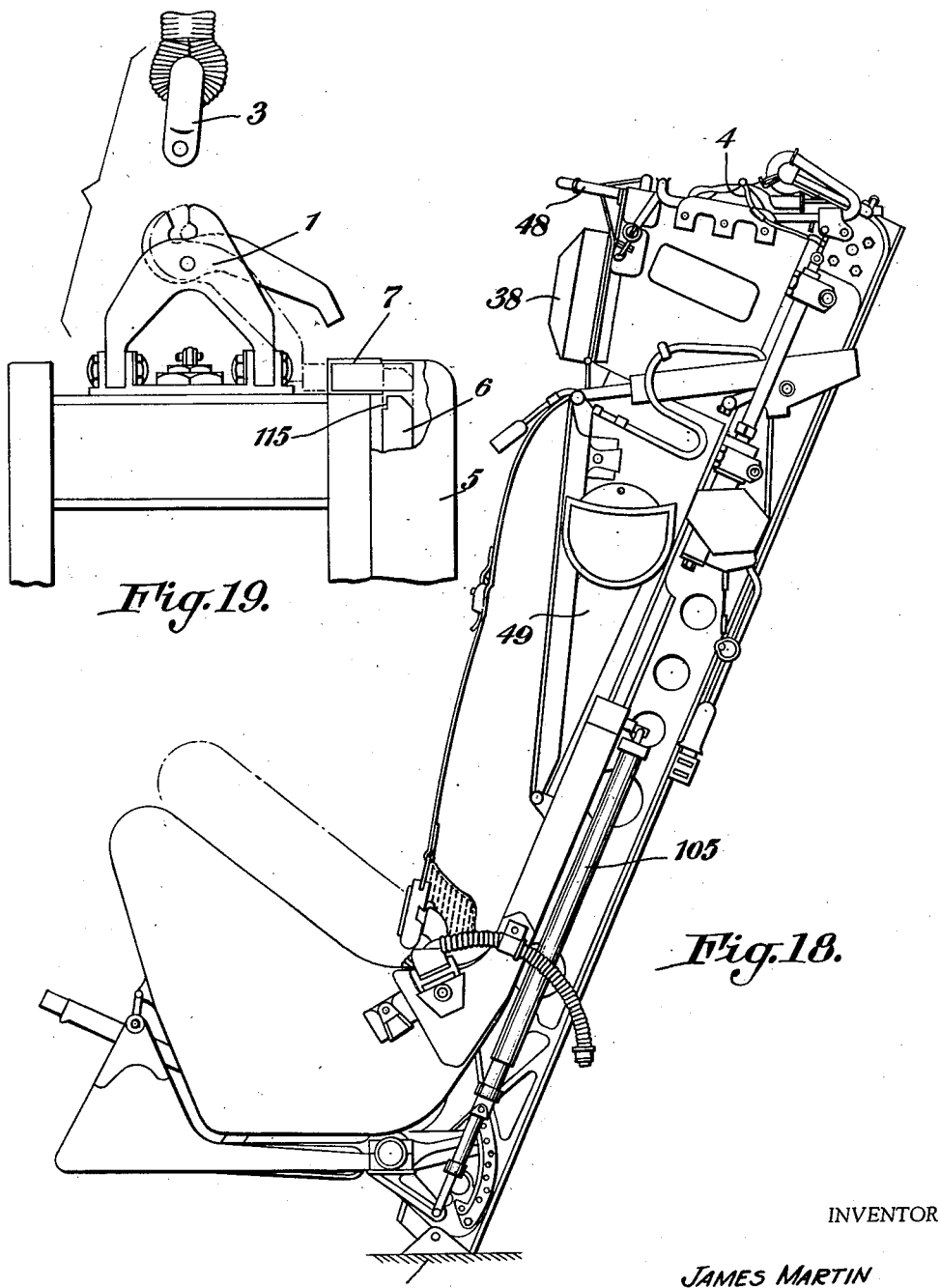

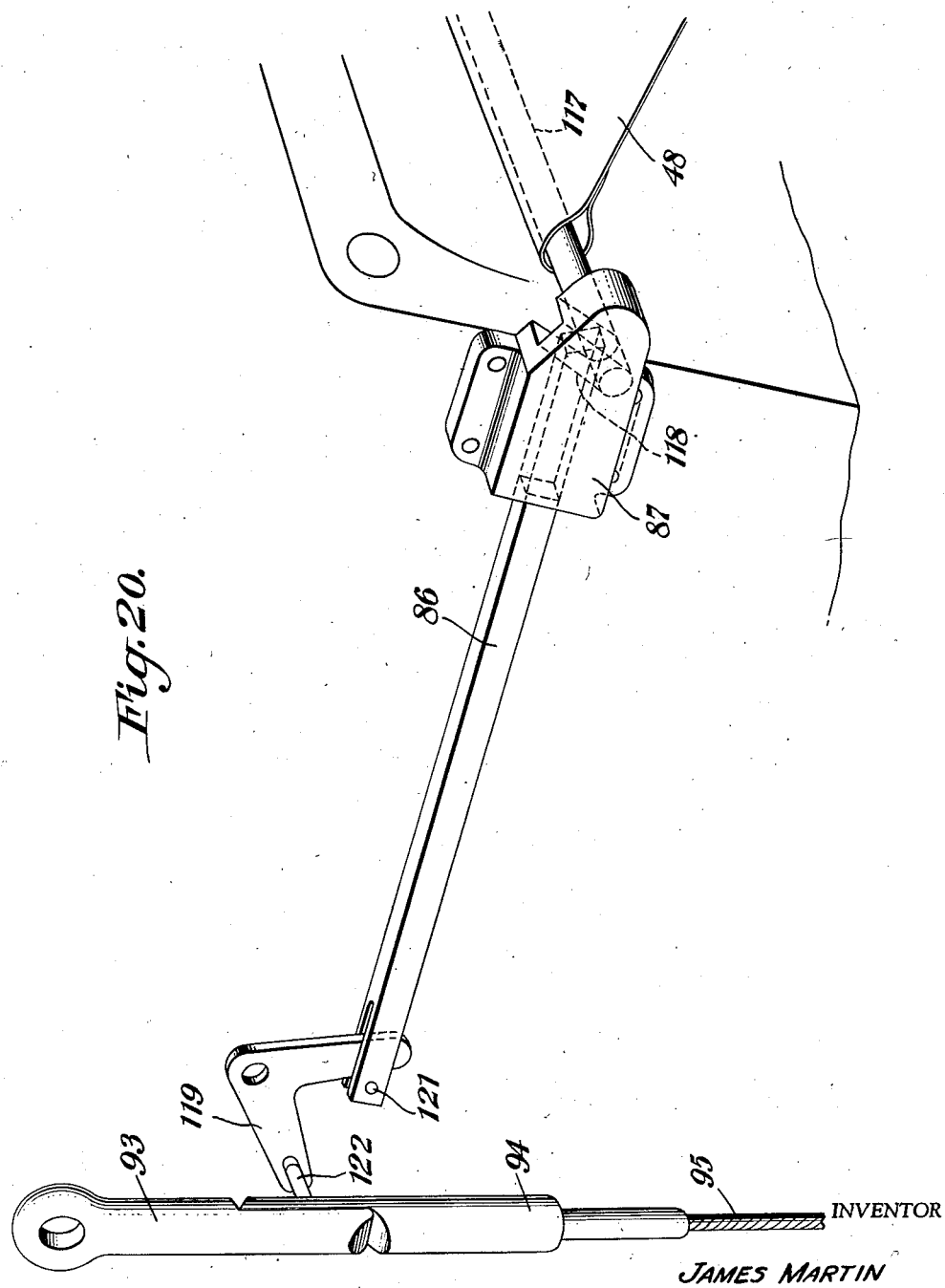

United States Patent Office 2,708,083
Patented May 10, 1955

2,708,083

EJECTION SEATS FOR AIRCRAFT

James Martin, Higher Denham, near Uxbridge, England

Application August 23, 1952, Serial No. 305,951

Claims priority, application Great Britain September 7, 1951

13 Claims. (Cl. 244—122)

This invention is directed to improvements in and relating to ejection seats for aircraft.

One of the objects of the invention is to convert what may be termed a non-automatic type ejection seat described in certain of our prior patents into an automatic type seat, that is to say, an ejection seat in which the pilot is relieved of all but the initial act of bringing the ejection apparatus into operation, and at the same time the various steps in the functioning of the apparatus will be carried out automatically in the correct sequence and timing.

In certain constructions according to our prior patents there is described a shackle attaching the drogue to the seat. The drogue parachute remains attached to the seat when ejection has taken place and serves to steady the seat.

The ejection seat is of the known type provided with a face screen which has two functions, namely, (a) to protect the airman's face against damage by the force of the slipstream and to avoid the risk of his lungs being inflated by the air pressure as the seat is ejected from the aircraft, and (b) during the act of drawing the said screen into position will actuate or release the firing mechanism of the main ejector gun to launch the seat.

The seat is ejected from an aircraft by an ejection gun operating between the seat frame and a fixed part of the aircraft. When the seat is ejected from the aircraft the drogue parachute is deployed automatically by a drogue gun which may be fired by a static line or cable connected to a suitable fixed part of the aircraft so that when the seat is safely launched the pull on the cable will cause the drogue gun to be fired to draw out the drogue parachute. Or the drogue gun may be fired by a time delay mechanism which is set in motion as the seat leaves the cockpit of the aircraft. The drogue parachute is housed in a container which is separate from that in which the main or personal parachute is housed. The drogue parachute is referred to hereinafter as the drogue.

By the present invention there is provided means which can be actuated in a simple manner and yet very efficiently to control the release of the drogue from the seat, the release of the face screen, the safety harness and the withdrawal of the main parachute, after the seat is ejected from an aircraft and the drogue drawn out or deployed so that an airman can make a normal parachute descent.

One feature of the present invention consists in providing a drogue shackle which is normally attached to the seat by a slip member or shackle, such as a scissors shackle, the latter being actuated by a release mechanism, effective after a predetermined time interval, to actuate the slip member or shackle so as to release the drogue shackle from the seat. Upon this taking place means become effective to release automatically the face screen from the seat, to release the seat safety harness and also to release the main parachute.

Another feature of the invention is the provision of means for adapting a standard parachute pack for automatic withdrawal of the main parachute.

With this arrangement there is incorporated a manual override whereby an airman when necessary can release the main parachute independently of the first mentioned feature.

The accompanying drawings illustrate examples of carrying into effect the improvements according to the present invention.

In the drawings:

Fig. 1 illustrates an ejection seat having one constructional example of the invention applied thereto.

Fig. 2 a detail view of a release pin device.

Fig. 3 is a composite view and shows the airman after the apron or sling and the seat safety harness and face screen have been released as hereinafter described.

Figs. 4 and 5 elevational views partly in section of a drogue shackle time release assembly.

Fig. 6 a detail view of a barostatic device.

Fig. 7 an elevational view partly in section of a harness release mechanism.

Fig. 11 shows a still further variant construction.

Figs. 12, 13, 14 and 15 illustrate how the parachute pack is opened up and the parachute released either automatically or manually.

Figs. 16 and 17 illustrate a triggering mechanism for the time release mechanism which may also control the firing of the known drogue gun.

Fig. 18 shows an ejector seat of the kind referred to before the drogue parachute is withdrawn.

Fig. 19 is a detail view of a bolt and plunger for holding the scissors shackle closed, and Fig. 20 is a detail view of releasing mechanism for the face screen in the construction according to Fig. 8.

Figure 7:
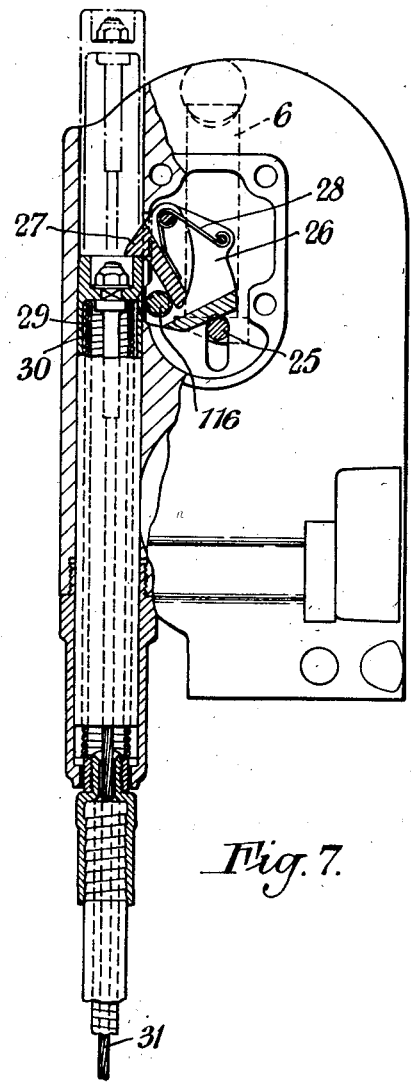

Referring to the construction illustrated by Figs. 1 to 7 of the drawings. In this arrangement there is a combined time release assembly having two functions, (a) to actuate the automatic slip device and (b) to release the safety harness.

The slip device or member consists of a scissors shackle 1 permanently attached to the top of the seat back 2. This scissors shackle 1 normally holds to the seat a dogue shackle 3 attached to a drogue line 4 which is secured to the drogue 114 (see Fig. 3). The drogue shackle is held in a slot formed between the two limbs of the scissors shackle.

The combined time release assembly is housed within a casing 5, and the component parts of the assembly are shown in detail in Figs. 4 to 7.

As shown in Fig. 19 the drogue shackle release mechanism comprises a restricting plunger 6 mounted in the casing 5. This plunger has a step 115 which in the cocked position locks a bolt 7, normally holding one limb of the scissors shackle 1 against movement. The full outline in Fig. 19 shows the plunger withdrawn and the scissors shackle opened up and the drogue shackle 3 released therefrom. The plunger 6 is normally held in the up position (to secure closure of the scissors shackle) against the pressure of a spring 8 by one arm of a bell crank lever 9 which is actuated by a rack member 10. Movement of the rack member 10 upwardly is under the pressure of a spring 11, the rate of movement being governed by a time delay mechanism comprising an escapement formed by a train of gears generally designated by 12, and having a final pinion 13 engaging the rack 10.

The lower end of the rack member 10 is formed as a hook to engage a latch 14, which latter is withdrawn from the lower end 10 by a sear 15 or by some other suitable trip mechanism on ejection of the seat from the aircraft. This sear may be operated by a cable connected to a suitable fixed part of the aircraft. The latch 14 is held to its fully cocked or set position and also to its withdrawn position by a spring loaded catch 16 engaging recesses 17 in the latch.

The rack member 10 has a channel slot 18 in which the other end of the lever 9 works.

The rack member 10 is guided for movement in a fitting 19 within the casing 5 secured to the seat back.

There may be incorporated with the time delay mechanism a barostatic device which prevents the operation of the time delay mechanism at altitudes greater than the one selected as being the most suitable, for example with the barostatic device set to withdraw interference at 10,000 feet altitude the time mechanism would be free to operate only at or below this altitude. Thus in cases of ejection at great altitudes the airman would fall with the seat retarded only by the action of the drogue, so that he can, as quickly as possible, descend from the extreme cold and rarified atmosphere to a height where normal breathing is possible before separating from the seat and thereafter descending relatively slowly on the main parachute. This barostatic device comprises a bellows 20 and a pin 21 engaging a toothed wheel 22 on the spindle 23 of the escapement. It will be understood that normally this pin 21 would not interfere with the operation of the escapement but at high altitude the prevailing low atmospheric pressure permits the bellows 20 to expand thus causing the pin 21 to advance between the teeth 22 and prevent the gears from working. As the pressure of the atmosphere increases on descending the bellows begin to collapse and eventually the pin is withdrawn and the gears are free to work.

Mounted upon or embodied in the time delay mechanism is a safety harness release mechanism which will now be described. The restricting plunger 6 which normally locks the bolt 7 against movement has a pin 25 at its lower end. This pin 25 normally holds in set position a latch assembly 26 (Fig. 7) comprising a latch 27 under the influence of a spring 28. A plunger barrel or sliding tube 29 under the pressure of a spring 30 located therein has a release cable 31 secured thereto. This cable runs through a flexible conduit. The other end of the cable is attached to a trunnion fitting on the end of a lever 32 on a safety harness box 33 of known type similar to that described in my prior Patent No. 2,457,252. The trunnion fitting is slidably connected on to the cable so as to permit manual operation of the harness release box without the necessity of sliding the cable upwards through the conduit.

There will now be described the means included in this construction for releasing the face screen and the main parachute.

Attached to the drogue shackle 3 is a lifting line 34 which is divided into branches 35 and 36. These branches may run in protective channels 37. The division of the line into branches is at the centre of a headrest 38.

The branches are connected first to quick release pins 39 and then to the top corners of an apron or sling 40. This apron or sling is attached to the back of the headrest or head pad 38. The branches 35 and 36 thereafter run downwards behind the apron 40 to which they are attached, finally to converge and emerge through a slot 42 in the apron in the form of a single plaited line or cable 43 terminating in a loop 44 referred to later.

To retain the apron 40 and head pad 38 in position on the seat two lugs 45 are attached to the top corners of the apron and headrest. These lugs 45 are entered into two small slotted fittings 46 fixed to each side of a box where the lugs 45 are retained by the quick release pins 39. Two similar lugs 47 attached to a face screen 48 are similarly retained by the quick release pins 39 thus serving to hold the face screen 48 in position (see Fig. 2).

The apron 40 extends downwards in front of the seat and lies back into the parachute container 49 coming outwards and downwards and is finally clipped in spring clips 50 to the face of the parachute container 49. The parachute pack 51 (see Fig. 3) is attached to the cable 43 and inserted into the container 49 in front of the apron 40.

On each side of the seat pan is a spring clip 52 in which engages a lug attached to a strap 53 which in turn is attached to the airman's parachute harness 101 (Fig. 3). The purpose of these clips is to prevent the airman leaving the seat too early in the sequence of operations and thus finding himself below the seat with the hazard of being struck by it in its passing. This coupling to the seat is the last to be released.

Certain modifications are made to the standard type of parachute pack. There is combined with the automatic means a manual override whereby an airman when necessary can release the main parachute independently of the automatic means controlled by the release of the drogue shackle. Figs. 12 to 15 inclusive illustrate this feature of the invention.

Two release pins 55 normally engage the usual coned closures 56 of the parachute pack. The standard rip cord 57 is modified by substituting for the conventional pins a small loop or eye 58 which engages one of the release pins 55. This pin 55 has an end loop or eye 59 embracing a line 60 which runs into the pack and is secured to the top of the parachute canopy. The other end of the line 60 terminates in a stiffened loop 61. The other release pin 55 is connected to the loop or eye 59 by a cable connection 62.

The coupling to the release pins 55 of the cable 43 from the apron or sling, or from a lifting line in some of the variant constructions described later is carried out in the following way.

At that end of the line or cable 43 remote from the apron or sling there is a sleeve 63 for example, a plastic sleeve, through which the line or cable passes. The cable or line terminates in a loop 44 referred to earlier.

A connecting pin 65 is mounted on a second sleeve 66 and superimposed on the pin is a spring hook 67. This second sleeve 66 is adapted to slide freely on the first mentioned sleeve 63. The loop 44 engages over the pin 65 after being threaded through the loop 61 of the line 60 running into the pack. As shown the pin 65 is slid forward to retain the loops in engagement. There is a breakable tie member 68, such as a cotton tie, which retains the pin 65 in its forward position through the loops, that is to say, the sleeve 66 cannot be withdrawn from its forward position until this tie member is broken.

Engaging the spring hook 67 is a loop or eye 69 attached to a manual override cable 70 which runs through a conduit 71 and terminates in a handle or hand grip 72 located on the parachute harness adjacent to the rip cord handle.

It will be appreciated that there is a continuous coupling from the drogue to the top of the main parachute canopy.

When the apron or sling or a lifting line is pulled by the drogue, a pull is exerted on the sleeves 63 and 66 and the spring hook 67 is disengaged from the loop or eye 69 of the manual override cable 70, the parachute pack release pins 55 are drawn out from the usual coned closures one pin passing through the rip cord loop or eye 58 so that the parachute is free to be withdrawn automatically from the pack.

The override manual control is provided to allow an airman to detach himself and the main parachute from the seat, so that in the event of any breakdown in the sequence of automatic ejection, or indeed, even before the ejection sequence is initiated, the airman has freedom of action.

In such an event the airman would have to disconnect himself from the connection to the apron or sling or the lifting line after releasing his safety harness. For this purpose he would actuate the manual override through the handle 72. This would cause the connecting pin 65 on the second sleeve 66 to break the tie member 68 and to slide along the first sleeve 63 thus withdrawing the connecting pin 65 from the loop 44 on the cable, and allow this loop 44 to disengage from the loop 61 on the line 60 running into the pack and secured to the top of the parachute canopy. On the airman getting out of the seat the eye 69 on the manual override disengages itself from the spring hook 67 and the airman is left with the parachute only.

Having left the seat in the aircraft the airman will then pull the rip cord 57 the eye or loop 58 thereon will then pull out the release pins 55 and become disengaged therefrom, thus leaving the parachute canopy free to develop in the ordinary way. Of course the parachute is at all times attached to the parachute harness worn by the airman, this parachute harness being distinct from the seat safety harness.

The parachute pack may have a protective leather flap for covering the manual override equipment.

As shown in Fig. 15 the manual override handle 72 and the rip cord handle 73 are mounted on a component 74 of the safety harness adjacent the harness box 33. For the purpose of ensuring that the manual override is operated before pulling the rip cord, the rip cord handle 73 is in a pocket 75, and an additional pocket 76 having a flap 77 is provided for the manual override handle 72. The flap 77 is folded back over the rip cord handle 73 and held in position by fasteners 78. When the override handle 72 is pulled to disconnect the parachute from its attachment to the apron or sling the flap 77 is released to uncover the rip cord handle 73 to enable the pilot to pull out the main parachute.

Figs. 16 and 17 illustrate an assembly of triggering mechanism for the release mechanism which may also serve to fire the known drogue gun to draw out the drogue. This triggering mechanism takes the place of the static line or cable and sear 15 previously referred to.

The triggering mechanism comprises a spring loaded hook lever 79 mounted on a cross member 80 attached to a fixed part of the aircraft. The hooked end of the lever 79 engages a lever 81 on a torque shaft 82 upon the other end of which is mounted a further lever 83 which replaces the sear 15. When the seat is ejected the lever 81 will be partially rotated by the hook lever 79 thus pulling out the rack latch 14 and allowing the rack member 10 to move upwardly as previously described. A further feature of this arrangement is that it is self-cocking, i. e. when the seat is lowered into position in the aircraft the lever 81 will strike the hook lever 79 pushing it aside until finally it can spring back into position ready to trip the mechanism as soon as the seat begins to rise. On the other end of the cross member 80 a projection 84 could be arranged to strike an attachment to the known drogue gun sear thus extracting it and firing the gun.

The sequence of operation when the seat is ejected from an aircraft is as follows:

On pulling down the face screen 48 the seat is ejected from the aircraft a fixed part of this being indicated by 104 by the firing of the main ejection gun 105. The upward movement of the seat causes the drogue gun 106 and the drogue release mechanism to begin operation. The drogue gun, with for example, one second delay would, after this interval, fire out the drogue piston which extracts the drogue. This steadies and retards the seat. Now five seconds after the seat has left the cockpit the drogue release mechanism has run its course, that is to say, the rack member 10 has moved upwardly, under the pressure of the spring 11, and is disengaged from the pinion 13 of the gear train of the time delay mechanism. During this movement the rack member strikes an arm of the bell crank lever 9 causing it to rotate, thus permitting the restricting plunger 6 to descend under the pressure of the spring 8 and permit the bolt 7 to be retracted from one of the limbs of the scissors shackle 1 whereupon the two limbs are opened up to release the drogue shackle 3, the latter being thereby freed from the seat.

Upon the plunger 6 being released by the mechanism and descending under the pressure of the spring 8, the plunger barrel carries with it the pin 25 away from the latch 27. When this happens the plunger barrel 29 is forced upwards by the spring 30 and during this movement swings the whole latch assembly 26, 27 about its pivot 25 out of the way, so that the plunger barrel 29 is free to move to the dotted position shown in Fig. 7, carrying with it the release cable 31 which turns the lever 32 on safety harness box 33 and withdraws the plungers of the safety harness box releasing airman from the seat safety harness 100.

The drogue, which is now free of the seat pulls the lifting line 34 out of the channels 37, then pulls out the quick release pins 39 thus freeing the face screen 48 (which comes away in the hands of the airman) and the apron 40 from the seat. The pull is then transmitted to the head pad 38 and apron 40 which, in straightening out, ejects the main parachute pack 51 from its container 49 behind the pilot. As the apron 40 is drawn upwards the line 43 next pulls out the pack release pins 55 and finally extracts the main parachute. The airman at this time is still attached to the seat by the straps 53 engaged by the spring clips 52 and as the main parachute canopy developes the inertia of the seat disengages the spring clips and permits the seat to fall away from the airman.

Radius arms consisting of outer sleeve like members 110 pivotally attached to the seat frame house sliding members 111 whose forward extremities 112 are attached to the top bar of the parachute container 49. Spring plungers contained within the members 110 engage in turn a series of notches in the sliding members 111. These plungers are actuated by the action of a pair of levers (not shown) the latter being moved by a cable attached to one or other of the levers, the cable having at its free end a control knob or handle within easy access of the airman. The object of these radius arms is to provide a limited amount of forward movement to the airman at will, the parachute container 49 swinging forward about its lower hinge 113.

Figure 8:
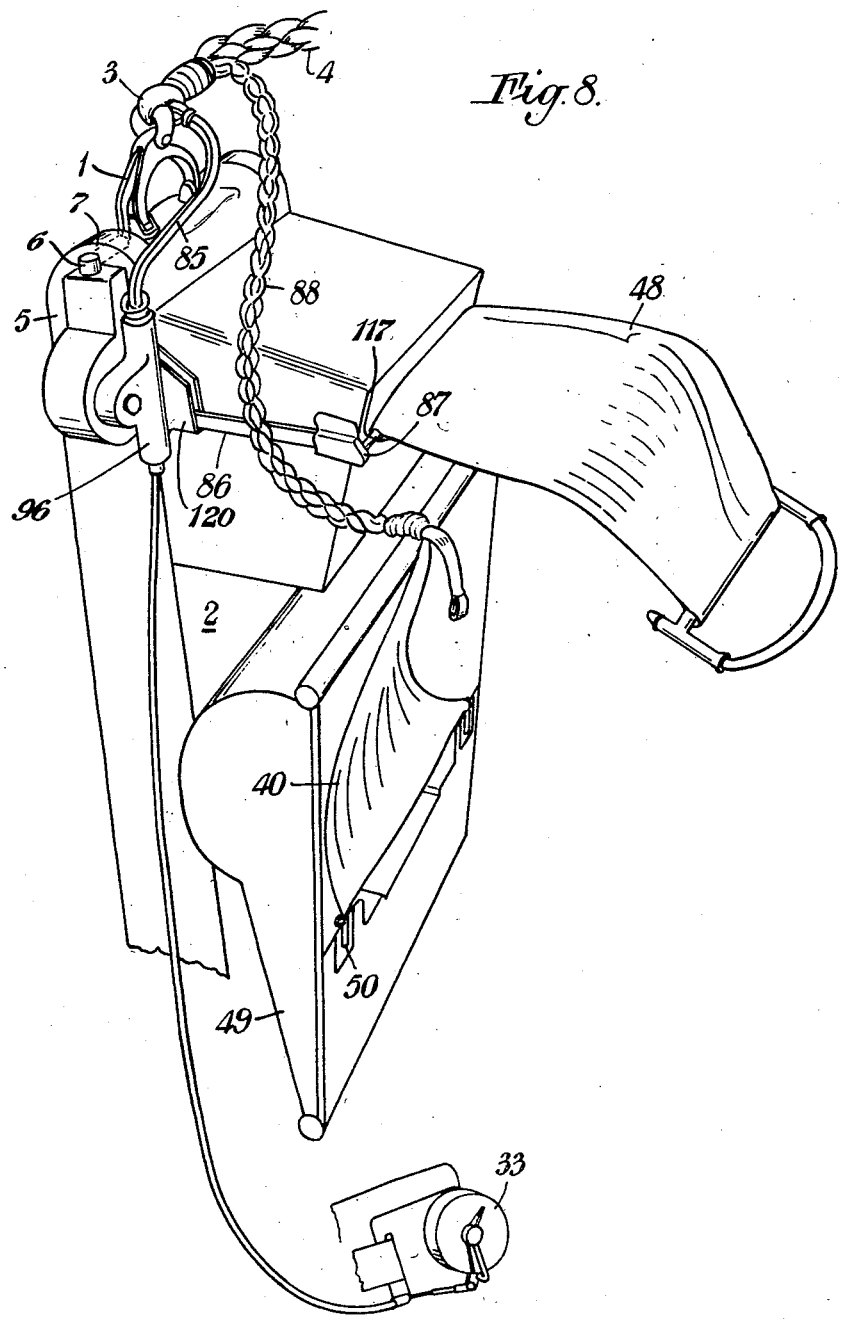
Fig. 8 is a perspective view of another construction.

In the construction according to Fig. 8 the release of the drogue shackle 3 from the scissors shackle 1 is effected by the release mechanism previously described. Attached to the drogue shackle 1 is a lifting line 85 which actuates a mechanism 94, 95, 96 that couples the release drogue to the safety harness box 33. The mechanism is so designed as to automatically disconnect one part thereof from another after a predetermined movement. This mechanism is more fully described in relation to Figs. 8 and 10.

As shown in Fig. 20 the face screen 48 has a cross member 117 supported in a slot 118 in a housing 87. This cross member is normally retained by a sliding member 86. The other end of this sliding member is slotted and receives one arm of a bell crank lever 119 pivoted in a bracket 120 (see Fig. 8), the said arm being retained in the slot by a pin 121. The other arm of the lever 119 engages a projecting peg 122 on the lower member 94 of a divided joint component 93, 94 working in a sleeve 96 (see Fig. 10). The upward movement of the members 93, 94 due to the action of the drogue, when the drogue shackle is released rotates the bell crank lever which withdraws the sliding member 86 and frees the cross member 117 of the face screen 48.

The apron or sling 40 is attached at its lower edge by spring loaded clips 50 to the lower edge of the parachute container and at its upper edge to a lifting line 88 connected to the drogue shackle or drogue line so that the pull of the drogue on the apron or sling 40 will press the parachute pack forward out of the container and then pull the apron or sling out of the spring loaded clips.

There is a connection from the line 88 to the release pin of the parachute pack and thence to the main parachute so that the drogue will extract the said parachute from the pack. The attachment to the parachute pack is as previously explained.

Figure 9:
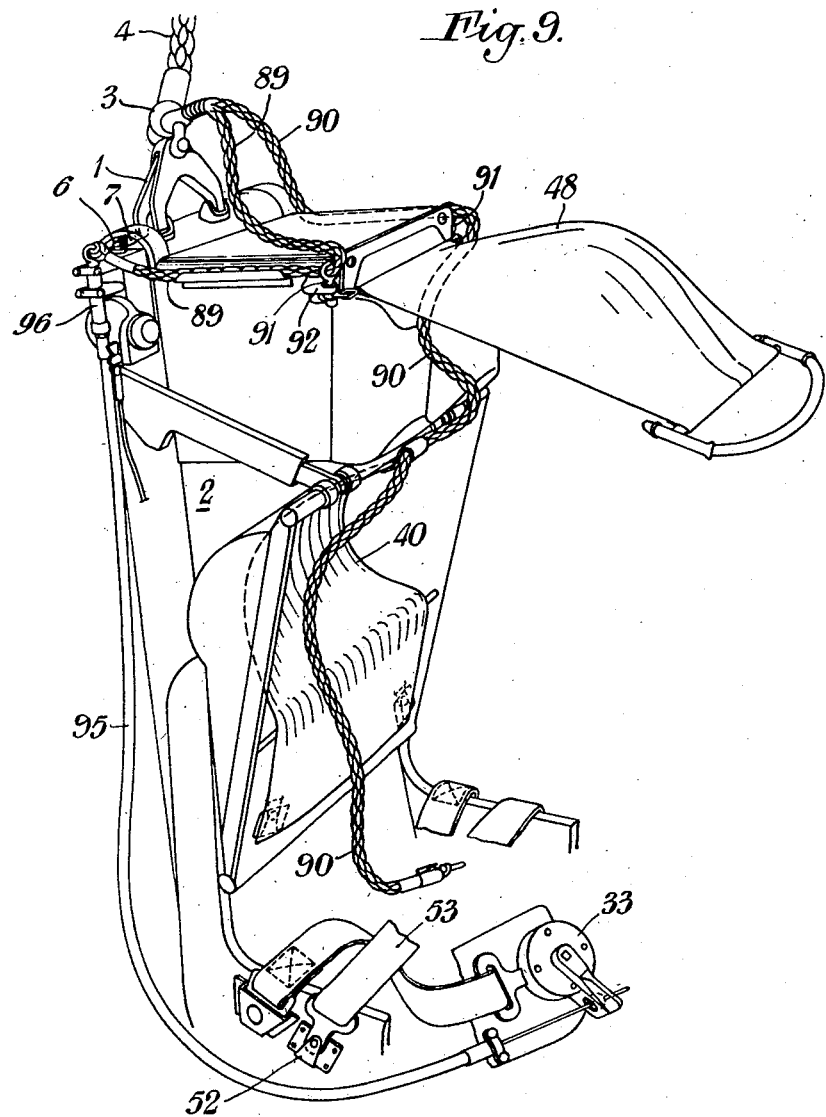
Fig. 9 illustrates a further construction and Fig. 10 a detail thereof.

Fig. 9 is a view of still another construction, and Fig. 10 a detail view partly in section of mechanism coupling the drogue to the safety harness box.

In this construction Fig. 9 there are two lifting lines 89 and 90 passing through plugs 91 which upon withdrawal from attachments 92 extending from the face screen 48 release the latter from the seat. One lifting line 89 then passes on to the mechanism coupling the drogue to the safety harness box. This mechanism comprises a divided joint component having an upper member 93 connected to a lower member 94 by a tapered dowel pin 95 (see Fig. 10). The lifting line 89 is connected to the upper member 93. The lower member 94 has connected thereto as by swaging a cable 95 leading to the lever on the safety harness release box 33. The members are kept in engagement by a sleeve 96.

The other lifting line 90 continues downward from the second release plug 91 and connects first to the top of the apron 40 housed in the container for holding the main or personal parachute. From this connection the line continues and is connected by a coupling member to release pins on the parachute pack and then to the apex of the main parachute canopy.

When the drogue shackle 3 is released from the scissors shackle 1, the drogue through the drogue line 4 exerts a pull on the lifting lines 89 and 90 and through these pulls out the face blind release plugs, thus detaching the blind from the seat. It then proceeds through the continuation part of the lifting line 89 to pull out the divided joint component and the upward movement thereof, through the cable releases the safety harness. When the joint is pulled from the sleeve 96 the upper member 93 is free to break away from the lower member 94.

The pull of the drogue through the lifting line 90 then acts on the top of the apron 40. This has the effect of straightening out the apron, which latter during this straightening movement ejects the parachute pack from the container and by the connection before described pulls out the release pins on the pack and subsequently withdraws the parachute canopy.

Fig. 11 shows a further variant construction. In this arrangement lifting lines 97 are connected to the drogue shackle 3 and from there pass to the plugs 91 of the face screen and then downwards to the apron or sling 40. The release of the drogue from the seat causes the lifting lines 97 to pull out the plugs and thus release the face screen. Also the apron or sling is drawn out and straightened thus expelling the parachute pack from the container. The shoulder safety harness is held by means of tapered plugs 98 having at their upper ends rings through which pass the lifting lines. The plugs fit into housings into which project spring loaded plungers engaging grooves in the tapered plugs. The shoulder safety harness is released by the withdrawal of the plugs 98 on the lifting lines being pulled on the release of the drogue shackle.

At the lower end of the apron or sling 40 are plugs 99 which normally retain the thigh safety harness 100 to the seat. On the straightening of the apron these plugs 99 are withdrawn thereby releasing the thigh harness and also the apron from the seat.

A cable 101 attached to the apron or sling leads to the release pins on the parachute pack.

In all the constructions the lifting lines or cables may run in guide channels or housings. The plug devices described in certain constructions may be replaced by pin devices similar to that shown in Fig. 3.

It will be apparent that the invention can be variously modified and changed within the scope of the appended claims.

I claim:

1. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position, means for releasing said holding means, a parachute pack container, an apron therein, a parachute pack holding a main parachute, means for opening up said pack, said parachute pack normally resting on said apron, timing mechanism for releasing the drogue shackle from the slip member, connections between the drogue shackle and the face screen, the apron, and the main parachute pack, said connections being operative when the drogue shackle is released from the slip member to release the face screen, to straighten the apron so as to eject the parachute pack from the container, and to open up the parachute pack to withdraw the main parachute therefrom, and means also operative on the freeing of the drogue shackle to release the seat harness, the pilot thus being freed entirely from the seat to enable him to make a normal parachute descent.

2. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position, means for releasing said holding means, a parachute pack container, an apron therein, a parachute pack holding a main parachute, means for opening up said pack, said parachute pack normally resting on said apron, timing mechanism for releasing the drogue shackle from the slip member, connections between the drogue shackle and the face screen, the apron, and the main parachute pack, said connections being operative when the drogue shackle is released from the slip member to release the face screen, to straighten the apron so as to eject the parachute pack from the container, and to open up the parachute pack to withdraw the main parachute therefrom, and means actuated by the timing mechanism and also operative on the freeing of the drogue shackle to release the seat harness, the pilot thus being freed entirely from the seat to enable him to make a normal parachute descent.

3. The combination in an ejection seat for aircraft having an ejection gun operating between the seat and a fixed part of the aircraft to eject the seat therefrom, seat harness, a face screen attached to the seat, a drogue gun and a drogue connected thereto, of a scissors shackle fixed to the seat, a drogue shackle attached to a drogue line secured to the drogue, said drogue shackle being normally retained in the scissors shackle, means for holding the face screen in position, means for releasing said holding means, a parachute pack container, an apron therein, a parachute pack holding a main parachute, means for opening up said pack, said parachute pack normally resting on said apron, timing mechanism for releasing the drogue shackle from the scissors shackle, connections comprising lifting lines between the drogue shackle and the face screen, the apron, and the main parachute pack, said connections being operative when the drogue shackle is released from the scissors shackle to release the face screen, to straighten the apron to eject the parachute pack from the container, and to open up the parachute pack to withdraw the main parachute, and means also operative on the freeing of the drogue shackle to release the seat harness, the pilot thus being freed entirely from the seat to enable him to make a normal parachute descent.

4. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the slip member, a lifting line connected to the drogue shackle, branches from said line leading to the release means for the face screen and then to the apron, said branches converging at the apron into a single line leading to the main parachute pack release means, the said lifting line and its branches being operative when the drogue shackle is released from the slip member to release the face screen, to straighten the apron to eject the parachute pack from the container, and to open up the parachute pack to withdraw the main parachute, and means actuated by the timing mechanism and also operative on the freeing of the drogue shackle to release the seat harness, the pilot thus being freed entirely from the seat to enable him to make a normal parachute descent.

5. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the slip member, a lifting line attached to the drogue shackle, mechanism at the other end of said lifting line for releasing the seat harness, an extension from said mechanism to means for releasing the face screen, a second lifting line attached to the drogue shackle and to the apron and to the opening means of the parachute pack, said lifting lines and mechanism becoming operative when the drogue shackle is released from the slip member to release the face screen, to straighten the apron to eject the parachute pack from the container, to open up the parachute pack to withdraw the main parachute, and to release the seat harness, the pilot thus being freed entirely from the seat to enable him to make a normal parachute descent.

6. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the slip member, lifting lines attached to the drogue shackle, mechanism for releasing the seat harness, one of said lifting lines being connected to said means for freeing the face screen and to the said mechanism, the other lifting line being connected to the apron and to the means for opening the parachute pack, whereby when the drogue shackle is released from the slip member said lifting lines release the face screen, straighten the apron to eject the parachute pack from the container, open up the parachute pack to withdraw the main parachute and release the seat harness, the pilot thus being freed entirely from the seat to enable him to make a normal parachute descent.

7. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the slip member, means for holding shoulder components of the seat harness, means for freeing these components, means for holding thigh components of the seat harness, means for freeing these components, lifting lines connected to the drogue, said lines passing through the releasing means for the face screen and the releasing means for the shoulder components and being finally attached to the apron, a cable at the lower end of said apron leading to the parachute pack releasing means, said lifting lines being operative when the drogue shackle is released from the slip member to release the face sceereen, to straighten the apron to eject the parachute pack from the container, to release the seat harness to open up the parachute pack to withdraw the main parachute, the pilot thus being freed entirely from the seat to enable him to make a normal parachute descent.

8. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack provided with flaps, closures therefor, release means normally engaging said closures, a line attached at one end inside the pack to the parachute, said parachute pack normally resting on said apron, time mechanism for releasing the drogue shackle from the slip member, connections between the drogue shackle and the face screen, and the apron, and the release means, and the line inside the pack, said connections being operative when the drogue shackle is released from the slip member to release the face screen, and to straighten the apron to eject the parachute pack from the container, and to open up the parachute pack to withdraw the main parachute, and means also opertive on the freeing of the drogue shackle to release the seat harness, the pilot thus being freed entirely from the seat to enable him to make a normal parachute descent.

9. In an ejection seat according to claim 8, having release means for the parachute pack closures, comprising two pins normally engaging said closures, a line attached at one end to the main parachute housed within the pack and having a loop at its other end, a loop on one release pin through which the line passes, a cable operated on the release of the drogue shackle from the slip member, a sleeve through which said cable passes, a loop at the end of the cable threaded through the loop on the line, a second sleeve sliding on the first mentioned sleeve, a pin on the second sleeve engaging the cable loop, means for normally retaining said pin against withdrawal, a spring hook on said pin, a manual override cable engaging said hook, and a standard rip cord detachably engaging one of the release pins, whereby when the drogue shackle is released from the slip member a pull is exerted through the cable on the said sleeves and the manual override cable is disengaged from the hook, the release pins are withdrawn from the closures, the rip cord disengaged and the parachute withdrawn from the pack.

10. In an ejection seat according to claim 8, having release means for the parachute pack closures, comprising two pins normally engaging said closures, a line attached at one end to the main parachute housed within the pack and having a loop at its other end a loop on one release pin through which the lines passes, a cable operated on the release of the drogue shackle from the slip member, a sleeve through which said cable passes, a loop at the end of the cable threaded through the loop on the line, a second sleeve sliding on the first mentioned sleeve, a pin on the second sleeve engaging the cable loop, means for normally retaining said pin against withdrawal, a spring hook on said pin, a manual override cable engaging said hook, and a standard rip cord detachably engaging one of the release pins, a harness component provided with two pockets, one for a handle of the manual override control and the other for a handle of the rip cord device, and means on the manual override pocket normally concealing the said rip cord device handle, whereby when the drogue shackle is released from the slip member a pull is exerted through the cable on the said sleeves and the manual override cable is disengaged from the hook, the release pins are withdrawn from the closures, the rip cord disengaged and the parachute withdrawn from the pack.

11. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the slip member, connections between the drogue shackle and the face screen, the apron, and the main parachute pack, said connections being operative when the drogue shackle is released from the slip member to release the face screen, to straighten the apron to eject the parachute pack from the container, and to open up the parachute pack to withdraw the main parachute, and means comprising a divided joint component also operative on the freeing of the drogue shackle to release the seat harness, the pilot thus being freed entirely from the seat to enable him to make a normal parachute descent.

12. The combination in an ejection seat for aircraft having an ejection gun operating between the seat and a fixed part of the aircraft to eject the seat therefrom, seat harness, a face screen attached to the seat, a drogue gun and a drogue connected thereto, of a scissors shackle fixed to the seat, a drogue shackle attached to a drogue line secured to the drogue, said drogue shackle being normally retained in the scissors shackle, means for holding the face screen in position on the seat, means for releasing said holding means, a parachute pack container, an apron therein, a parachute pack holding a main parachute, means for opening up said pack, said parachute pack normally resting on said apron, timing mechanism for releasing the drogue shackle from the scissors shackle, connections between the drogue shackle and the face screen, the apron, and the main parachute pack, said connections being operative when the drogue shackle is released from the scissors shackle to release the face screen, to straighten the apron to eject the parachute pack from the container, and to open up the parachute pack to withdraw the main parachute, and means also operative on the freeing of the drogue shackle from the scissors shackle to release the seat harness, the pilot thus being freed entirely from the seat to enable him to make a normal parachute descent.

13. The combination in an ejection seat for aircraft having an ejection gun operating between the seat and a fixed part of the aircraft to eject the seat therefrom, seat harness, a face screen attached to the seat, a drogue gun and a drogue connected thereto, of a slip member fixed to the seat, a drogue shackle attached to a drogue line secured to the drogue, said drogue shackle being normally retained in the slip member, a parachute pack container, an apron therein, means for holding the face screen in position on the seat, means for releasing said holding means, a parachute pack holding a main parachute, means for opening up said pack, said parachute pack normally resting on said apron, timing mechanism comprising a barostatic device for releasing the drogue shackle from the slip member, connections between the drogue shackle and the face screen, the apron, and the main parachute pack, said connections being operative when the drogue shackle is released from the slip member to release the face screen, to straighten the apron to eject the parachute pack from the container, and to open up the parachute pack to withdraw the main parachute, and means also operative on the freeing of the drogue shackle to release the seat harness, the pilot thus being freed entirely from the seat to enable him to make a normal parachute descent.

References Cited in the file of this patent

FOREIGN PATENTS 652,131  Great Britain  _____ Apr. 18, 1951